R. GRAFTON.
CATTLE STANCHION.
APPLICATION FILED SEPT. 24, 1907.

913,723.

Patented Mar. 2, 1909.
2 SHEETS—SHEET 1.

WITNESSES

INVENTOR
R. GRAFTON

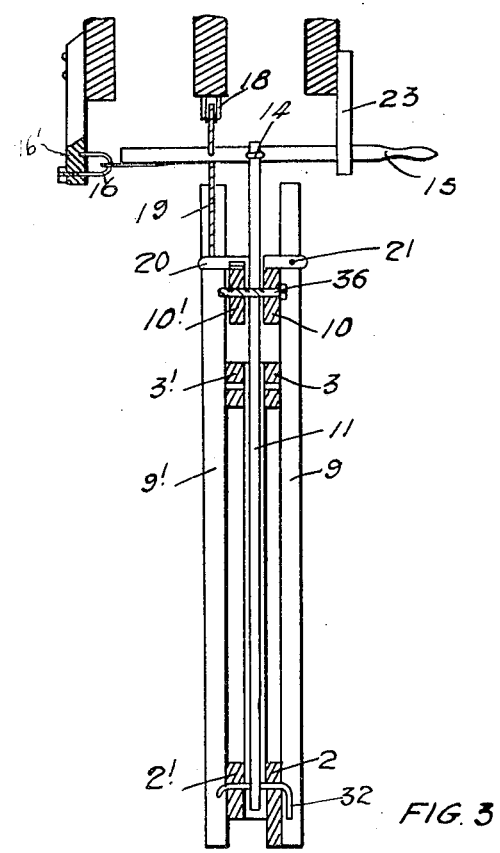
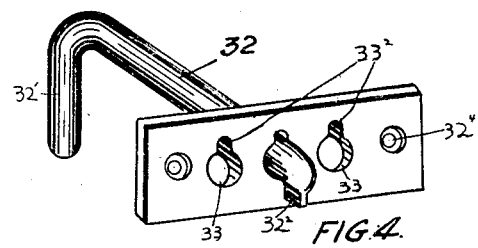
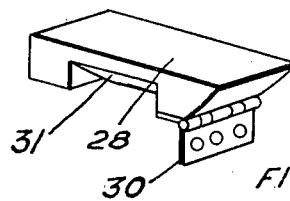

UNITED STATES PATENT OFFICE.

ROYAL GRAFTON, OF MOUNT CHARLES, ONTARIO, CANADA.

CATTLE-STANCHION.

No. 913,723.  Specification of Letters Patent.  Patented March 2, 1909.

Application filed September 24, 1907. Serial No. 394,340.

*To all whom it may concern:*

Be it known that I, ROYAL GRAFTON, of the post-office of Mount Charles, in the county of Peel, in the Province of Ontario, Canada, have invented certain new and useful Improvements in Cattle-Stanchions, of which the following is the specification.

My invention relates to improvements in cattle stanchions, and its object is to provide a set of stanchions which can be opened or closed either simultaneously or one at a time, so that either the whole or any number of animals can be admitted or released as desired.

A further object is to produce a set of stanchions, which are cheap, and easily constructed and at the same time very durable, and it consists essentially of a rigid framework provided with horizontal upper and lower members, a plurality of vertical bars pivotally connected at their lower ends to the aforesaid lower horizontal members, horizontal longitudinally movable members, inclined bars pivoted at their lower ends in the horizontal lower members and at their upper ends to the horizontal longitudinally movable members, which are thereby enabled to swing parallel to the upper horizontal members of the frame, a lever loosely connected to one of the aforesaid inclined members, whereby such member may be operated, a latch to which said lever is connected, an engaging projection extending from the horizontally longitudinally movable members, designed to coact with the said latch, to prevent the longitudinal movement of the swinging members designed to open the stanchion, as hereinafter more particularly described by the following specification.

Figure 1:
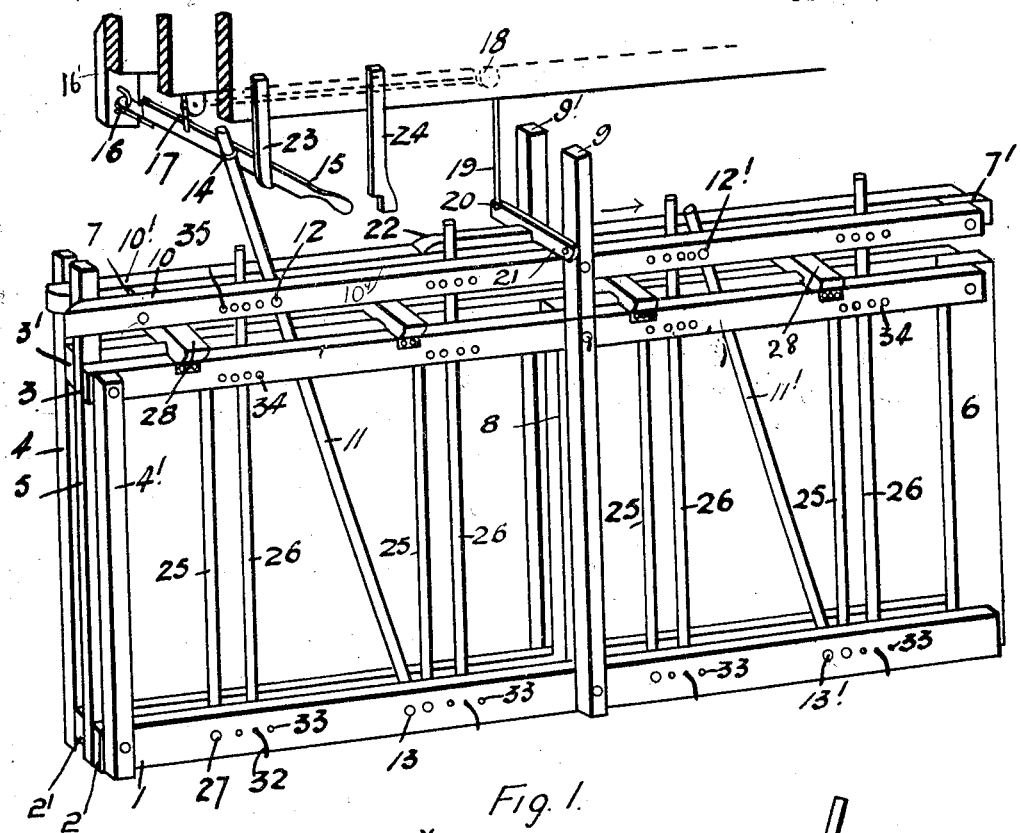
Figure 2:
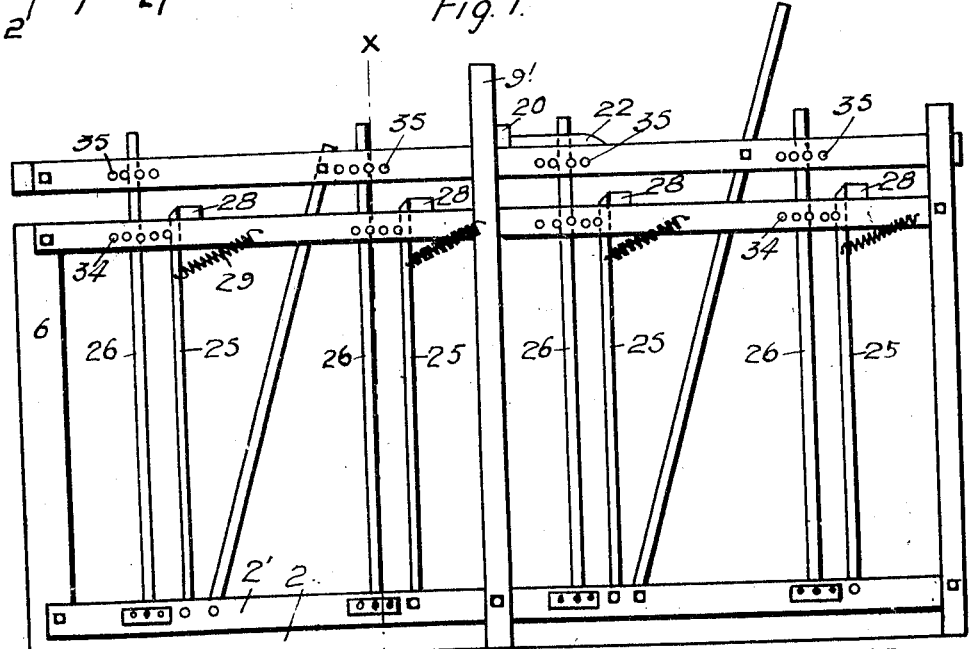

Figure 1, is a perspective view showing a section of my stanchion adapted to hold four cattle. Fig. 2, is a rear elevation of Fig. 1, the operating lever being omitted. Fig. 3, is a section on line *x—x* Fig. 2. Fig. 4 is a detail of one of the removable pivot pins of the stanchion bars. Fig. 5 is a perspective detail of a latch for fastening the individual stanchions.

In the drawings like numerals of reference indicate corresponding parts in each figure.

1 is the framework consisting of the lower horizontal members 2 and 2'. The member 2 extends to the floor of the stall to prevent dirt passing beneath and between the members 2 and 2' and accumulating, so as to cause decay.

3 and 3' are the upper horizontal members.

The members 2 and 2' and 3 and 3' are rigidly connected at one end to the vertical members 4, 4' and 5, and at the other end to the vertical member 6. The members 2 and 2', and 3 and 3' are also rigidly connected intermediately of their length to the uprights 8, 9, and 9'. The members 5, 6, and 8 serve to separate the horizontal members, thereby leaving an intervening space between such members.

10 and 10' are longitudinal members extending between the members 9 and 9'. 7 and 7' are rectangular blocks inserted and suitably secured between the members 10 and 10' so as to form an intervening space 10* between such members. 11 and 11' are inclined bars pivotally connected at their lower ends between the horizontal members 2 and 2' by the pivot bolts 13 and 13' passing through the horizontal members 2 and 2' and the said inclined bars. In proximity to their upper ends the inclined bars 11 and 11' are pivotally connected between the members 10 and 10' by the bolts 12 and 12' passing through such members and through the inclined bars. It will be seen from this description that the horizontally swinging bars 10 and 10' are supported by the inclined bars 11 and 11'. The bar 11 is longer than the bar 11' for the purpose which will hereinafter appear.

15 is an operating lever which is pivotally connected by means of an eye 16 to a suitable support 15'. The eye 16 is formed with one leg longer than the other, such leg passing through the support 16' and being threaded to receive a suitable nut as indicated in Fig. 3 of the drawing. The lever 15 is provided with an eye or loop 14 through which the upwardly extended bar 11 loosely passes.

17 and 18 are pulleys over which a cord or other flexible connection 19 passes, one end of such connection being fastened to the lever 15.

21 is a pivoted latch connected to the vertical member 9. The latch extends across over the swinging members 10 and 10' between the vertical members 9 and 9' to where the flexible connection 19 is attached at 20.

22 is a stop projection which extends from the swinging member 10' and normally engages with the latch bar 21 and prevents the swinging members 10 and 10' from moving in the direction indicated by arrow, so as to open out the stanchion bars 26.

23 is a depending hook catch in which the depending lever 15 is designed to normally rest.

24 is a depending bar having a notched lower end designed to receive the lever in the open position of the stanchion.

25 and 26 are upright bars between each pair of which the neck of an animal is inserted and held. The rods 25 are pivotally connected to the members 2 and 2' of the frame by bolts 27, their upper ends which rest against the latches 28 being beveled as shown in Fig. 2. The rods 25 are pressed against the latches 28 by means of springs 29 as shown in Fig. 2.

In Fig. 5, is shown a detail of one of the latches which are supplied with hinges 30 by means of which they are connected to the frame as shown in Fig. 1. These latches are provided with inclined curved portions 31 which coact with the beveled portions of the uprights 25. The rods 26 are longer than the rods 25 and extend between and above the members 10 and 10'. The rods 26 are pivotally connected to the frame at their lower ends by means of pins 32. The pins 32 are formed with an end portion 32' turned at right angles to the main portion of the pin and forming a handle. At the opposite end of the pin, a lug 32² is provided, extending at right angles therefrom. A plate 32³ is secured by screws extending through holes 32⁴ to the member 2. The plate 32³ is provided with holes 33 having slotted portions 33² extending vertically upwardly therefrom. To insert the pin 32 through one of the holes 33 I turn the pin so that the lug 32² faces upwardly registering with the slot 33² and then pass the pin through one of the holes 33 and through corresponding holes in members 2 and 2'. I then give the pin a half turn so as to carry the lug 32² out of alinement with the slot 33². In this position it is impossible for the pin to work loose. By inserting the pin 32 in different holes 33, the distance between the rods 25 and 26 can be altered at will, the object being to provide for cows having different sized necks.

The upper horizontal members 3 and 3' and the swinging members 10 and 10' are provided with a corresponding series of holes 34 and 35 into which are inserted bolts 36, see Fig. 3, having a coarse screw thread formed in the shank thereof, the object of this thread being to provide a rough surface which will prevent the pin from slipping out. Three of these pins are used and are inserted in either set of holes according to the result desired, one of them being inserted on either side of the rod 26 which thus passes up between them.

The operation of my stanchion is as follows. Suppose that, as shown in the drawings, the stanchions are closed and it is desired to throw them open simultaneously. To do this, the pins 36 are inserted in a pair of holes 35, one on either side of the rod 26. The lever 15 is then lifted from the catch 23 and slightly depressed. This raises the latch 21 thereby releasing the swinging members 10 and 10'. The lever is then moved horizontally to the right carrying with it the inclined rod 11 which swings the members 10 and 10' longitudinally carrying with them the upper ends of the rods 26. By the above operation the stanchions are opened simultaneously permitting the cattle to insert their heads between the rods 25 and 26. The stanchions may then be closed by an exactly similar operation as already described performed in the reverse order. If when the stanchions have been closed it is found that one of the cows is not in its place, that particular stanchion can at once be opened by simply raising the latch 28, when the rod 25 is immediately drawn to one side by the spring 29 thus opening the stanchion. In a similar manner any cow can be liberated without opening all the stanchions.

When it is desired to close the stanchions after one of the cows has been liberated as described, the rod 25 is pushed back into place, the beveled end coming into contact with the curved portion 31 of the latch 28, forcing the latter up until the rod is in its normal position when the latch falls by its own weight and secures the rod. Again if it is desired to retain one of the cows and liberate all the rest, the left hand pin 36 is removed from the holes in the swinging member which correspond to the stanchion in question and is inserted in the right hand holes in the members 3 and 3'. The result of this is that when the swinging member is moved it does not carry the rod 26 with it and that stanchion remains closed.

In order that the cows may be as comfortable as possible I make the distance between the upper bar of the horizontal members 3 and 3' and the lower pair of horizontal members 2 and 2' greater than is absolutely necessary, in other words, the length of the stanchion bars 25 and 26 is greater than is necessary. It is also provided that the rods 25 and 26 move very loosely on the pins 27 and 32 so that the rods may be sprung apart by the cows to a certain extent.

It is always more difficult to close the stanchions when the cows are in position than it is to open them, as in opening them there is no bearing pressure against the rods 25. In order to obviate this the rods 11 and 11' are placed on a slant as shown, this being found in practice to overcome the above difficulty.

Another advantage attending the use of my stanchion is that in the operation of milking the cows it is not necessary to crowd in between them, as when each cow is milked it can be released by simply releasing the corresponding latch 28.

What I claim as my invention is:

1. In a cattle stanchion, the combination with the rigid framework formed by two horizontal upper members and two horizontal lower members, the said upper and lower members being separated from each other so as to have an open space between them, vertical end members to which are rigidly attached the horizontal members, a plurality of vertical stanchion bars disposed in pairs and having their lower ends pivoted between the said lower horizontal members and their upper ends extending through the opening between the upper horizontal members, a pair of horizontal swinging members, spacing blocks secured between them forming an intervening space through which one of each pair of the vertical stanchion bars pass, engaging means between the said bars and the swinging members, inclined bars extending through the opening between the swinging members and pivotally connected on their lower ends between the lower horizontal members and at their upper ends to the swinging members, and means whereby the swinging members are swung longitudinally through an arc in a vertical plane, as and for the purpose specified.

2. In a device of the class described, the combination with the rigid framework, of a series of vertical bars pivoted in the framework and a second series of vertical bars pivoted in the framework and designed to coact with the aforesaid vertical bars, inclined bars also pivoted in the framework and a pair of swinging horizontal members carried by the inclined bars and engaging one of the series of vertical bars aforesaid and means whereby the horizontal members may be swung longitudinally through an arc in a vertical plane, as and for the purpose specified.

3. A cattle stanchion comprising a rigid framework, a swinging member having holes extending therethrough, a plurality of vertical bars disposed in pairs and pivoted in the frame, one bar in each pair being longer than the other and passing through the swinging member, threaded pins passing through holes in the swinging member on either side of the aforesaid bar, inclined bars pivoted at their lower ends in the frame and pivoted in proximity to their upper ends in the swinging member, one of the inclined bars extending upwardly above the swinging members, a lever pivoted at one end, an eye secured to the lever through which the upper end of the inclined member passes, a latch attached to the frame and connecting means between the latch and lever designed to operate the latch, a stop projection formed on the horizontal swinging member designed to coact with the latch to prevent movement tending to spread each pair of pivot bars apart as and for the purpose specified.

4. In a device of the class described, the combination with the upper and lower horizontal members connected together and forming a rigid frame, of longitudinally swinging members, bars pivotally connected thereto and to the lower horizontal members, co-acting pairs of uprights, one member of each pair having a beveled upper end and all of said uprights being connected to the lower members of the frame, and latches having beveled portions co-acting with the bevel portions of the uprights and designed to allow such uprights to pass into the locked position so as to prevent the opening of the stanchion.

ROYAL GRAFTON.

Witnesses:
E. J. BUTLER,
C. B. COLLINS.